United States Patent
Edney et al.

[11] Patent Number: 5,988,461
[45] Date of Patent: Nov. 23, 1999

[54] DRY LUBE DISPENSER

[75] Inventors: William J. Edney, Greeneville, Tenn.; Dennis Marak, Rutherfordton, N.C.

[73] Assignee: Aluma-Tech, LLC, Rutherfordton, N.C.

[21] Appl. No.: 08/920,071

[22] Filed: Aug. 26, 1997

[51] Int. Cl.[6] ................................................ B67D 5/08
[52] U.S. Cl. .................... 222/638; 222/638; 222/639; 222/642; 222/643; 222/413
[58] Field of Search ........................... 222/630, 637–639, 222/642, 643, 252, 412, 413

[56] References Cited

U.S. PATENT DOCUMENTS

| | | |
|---|---|---|
| 3,151,782 | 10/1964 | Wahl . |
| 4,044,925 | 8/1977 | Mercer . |
| 4,877,568 | 10/1989 | Austin . |
| 5,076,339 | 12/1991 | Smith . |
| 5,114,684 | 5/1992 | Kuc, Sr. . |
| 5,301,844 | 4/1994 | Ricciardi . |

Primary Examiner—Joseph A. Kaufman
Assistant Examiner—David Deal
Attorney, Agent, or Firm—Pitts & Brittian, P.C.

[57] ABSTRACT

A dispenser for volumetrically controlling the amount of lubrication which is fed into the shot sleeve of a die casting machine. Lubrication beads are fed into a hopper. The beads gravitationally travel through a port in the base of the hopper and into a screw extruder. The beads are then moved through a screw extruder both mechanically and pneumatically. The beads are moved mechanically by the rotation of the screw shaft in the screw extruder with a rotary motor. The beads are moved pneumatically by injections of air fed into the screw extruder. The air flow serves the additional purpose of cooling the beads as they move along the screw feeder so that they do not melt and become coagulated. The rotary motor and the air flow are both activated and deactivated by the use of adjustable timers. The timers are synchronistically metered so that the lubricating beads move through the shot bead dispenser and into the die casting machine at predetermined rates.

8 Claims, 4 Drawing Sheets

DRY LUBE DISPENSER

TECHNICAL FIELD

The present invention relates in general to material feeding devices. More specifically, it pertains to apparatus for dispensing solid additives into the shot sleeve of a die casting machine or an injection molding device.

BACKGROUND ART

Extrusion is a well known process in which molten metal or some meltable substance such as plastic is introduced into the shot sleeve of a die casting machine or an injection molding device. The substance to be extruded is then forced by the application of pressure into the die cavity of a mold. Pressure is exerted by activating either a reversibly movable plunger or a screw extruder within the shot sleeve. Turning the screw extruder or moving the plunger forward through the shot sleeve will force the extrudant into the die cavity.

The process of forcing molten metal or some meltable substance into a die cavity produces friction between the extrudate and the metal surfaces within the shot sleeve. These metal surfaces include the inside barrel of the shot sleeve and, if used, the threads of a screw feeder. The amount of friction will depend upon the material being injected, the temperature inside the shot sleeve, and the amount of pressure being applied.

It is desirable that the amount of friction be controlled. In the context of metal die casting, the complete elimination of friction is desired. Friction increases the amount of power required to drive the motor which rotates the screw feeder or activates the plunger. It also acts as a source of physical wear as extrudate is forced by pressure into the die cavity.

In other applications, the presence of some friction is desirable. An example occurs during plastic injection molding where pellets of polymeric material are mixed and melted through the extrusion process. A certain amount of friction is needed in order to cause melting of the pellets as they move through the stationary barrel, or shot sleeve.

Whether the application involves metal die casting, plastic injection molding, or some other casting process, a way of controlling the level of friction inside the shot sleeve during the extrusion process can be achieved by introducing a lubricant. Prior art reveals efforts which have been made by others to introduce either liquid or solid lubricating additives. U.S. Pat. No. 4,877,568 discloses a process by which a liquid lubricant is mixed with pellets of polymeric material during injection molding by forcing the lubricant through a canal or "root" formed internal to the shaft of a screw feeder. The lubricant is able to travel through the screw shaft and then empty into the shot sleeve through an orifice within the screw which fluidly connects the shot chamber with the root.

U.S. Pat. No. 5,076,339 discloses the use of a solid lubricant in the form of a stick. The lubricant stick is manually inserted into a pour hole formed within the shot chamber proximal to the input end of the shot sleeve. The lubricating stick melts upon contact with the shot sleeve. This method, of course, requires the user to operate the die casting machine without lubricant until it becomes heated, and then manually insert the solid lubricant. This, in turn, subjects the operator to the risk of burns to his or her fingers.

Neither U.S. Pat. No. 4,877,568 nor U.S. Pat. No. 5,076,339 provides a mechanical means for controlling the amount of lubricant injected into the shot sleeve. Further, neither of these methods involves the use of lubricating beads, sometimes referred to as dry lube. Solid beads are cleaner to work with than liquid and work just as well. Further, unlike solid sticks, dry lube can be injected into the shot sleeve mechanically during die casting. Hence, a means for mechanically feeding lubricating beads into the shot sleeve of a die casting machine at a controllable rate is needed.

Volumetric dry solids materials feeders are known. As noted in U.S. Pat. No. 5,301,844, various feeders have been designed "to discharge material such as powders, granules, or stranded fiberglass at a predetermined rate based on volume." U.S. Pat. No. 5,301,844 and U.S. Pat. No. 3,151,782 each disclose a volumetric materials feeder which employs a vertical feeding auger. These devices utilize a vibratory mechanism for shaking material through the auger as it turns. These devices are unsuited for dispensing dry solids which are prone to melt. Thus, a dry solids materials feeder containing a means of cooling the solids during dispensing is needed.

Horizontal screw feeder mechanisms are also known. As already noted, these mechanisms operate to extrude molten metal or some meltable substance during die casting or injection molding. See U.S. Pat. No. 4,877,568, and U.S. Pat. No. 4,044,925. These devices do not serve a volumetric feeding function, nor do they dispense dry solids. U.S. Pat. No. 5,114,648 discloses a method for pelletizing thermoplastic resin products by grinding and treating rubber compositions and extruding the resulting material through a screw feeder, They also, like the vibrating vertical auger mechanisms discussed above, have no cooling feature.

In summary, the prior art fails to disclose a method by which a beaded lubricant may be volumetrically introduced into a shot sleeve during the die casting or injection molding process. Prior art further fails to disclose a method for cooling a dry solid such as dry lube while it is being mechanically dispensed. Hence, it is an object of the present invention to provide a method for controlling the amount of lubricant placed within the shot sleeve of a die casting machine or injection molding machine. It is an additional object of this invention to provide a dispenser external to a die casting or injection molding machine which can volumetrically dispense lubricating beads without interrupting the die casting or molding process.

It is another object of the present invention to utilize a horizontal screw feeder which receives lubricating beads at one end and delivers the beads at the other, with the screw feeder operating on a timer so that the dispensing of lubricant is controlled.

It is also an object of the present invention to have a dry lube dispenser having within it an air flow operating synchronistically with the motor for assisting the beads through the screw extruder, and for cooling the dry lube pellets to prevent melting and coagulation.

DISCLOSURE OF THE INVENTION

Other objects and advantages will be accomplished by the present invention which allows the user of the invention to control the amount of lubricant delivered to the shot sleeve of a die casting machine. The preferred embodiment of this invention resides in the use of pelletized or beaded lubricant rather than the traditional liquid lubricant or the use of a solid stick lubricant. The lubricating beads, referred to as dry lube, are placed into a hopper above the dispensing mechanism. The hopper is configured with sides which slope into the center, and a port at the center through which the beads fall The port is sealingly connected to a vertical channeling device. The beads gravitationally move from the hopper, through the port, and into the top of the vertical channeling device.

The vertical channeling device is positioned between the hopper and a screw extruder. The bottom of the channeling device is sealingly connected to a port at the proximal end of the screw extruder. In this way, the beads enter the screw extruder at the proximal end.

The screw extruder defines a threaded metal shaft inside of a stationary horizontal and cylindrical housing. The shaft is connected to a motor which rotates the shaft inside of the stationary housing. When the lubricating beads fall through the port in the proximal end of the housing, they drop between the threads of the screw shaft. When the screw shaft is rotated, the beads are moved from the proximal end of the shaft to its distal end.

At the distal end of the screw shaft, an output port is placed in the distal end of the housing. The lubricating beads are forced through the output port and then into a shot sleeve conduit. The shot sleeve conduit is sealingly connected to the housing output port. The beads are assisted in this movement by a flow of air which is forced into the system below the housing output port such that air travels both into the housing and the shot sleeve conduit. In this way, the beads travel with minimal friction with the housing and with each other. The air also serves to cool the dispenser system so as to prevent melting and coagulation of the shot beads.

The beads are ultimately forced out of the shot sleeve conduit and into the shot sleeve of a die casting machine. The rate of this movement is controlled by connecting both the motor and the air thrust to timers. The timers are synchronized so that the rotation of the motor and the thrust of air occur together. Those skilled in the art will understand that the cycles for the timers can be adjusted. In this way, a correlation can be made between the length and number of cycles, and the volume of lubricating beads passing into the die casting machine.

BRIEF DESCRIPTION OF THE DRAWINGS

The above mentioned features of the invention will become more clearly understood from the following detailed description of the invention read together with the drawings in which.

DESCRIPTION OF THE PREFERRED EMBODIMENT

Figure 1:
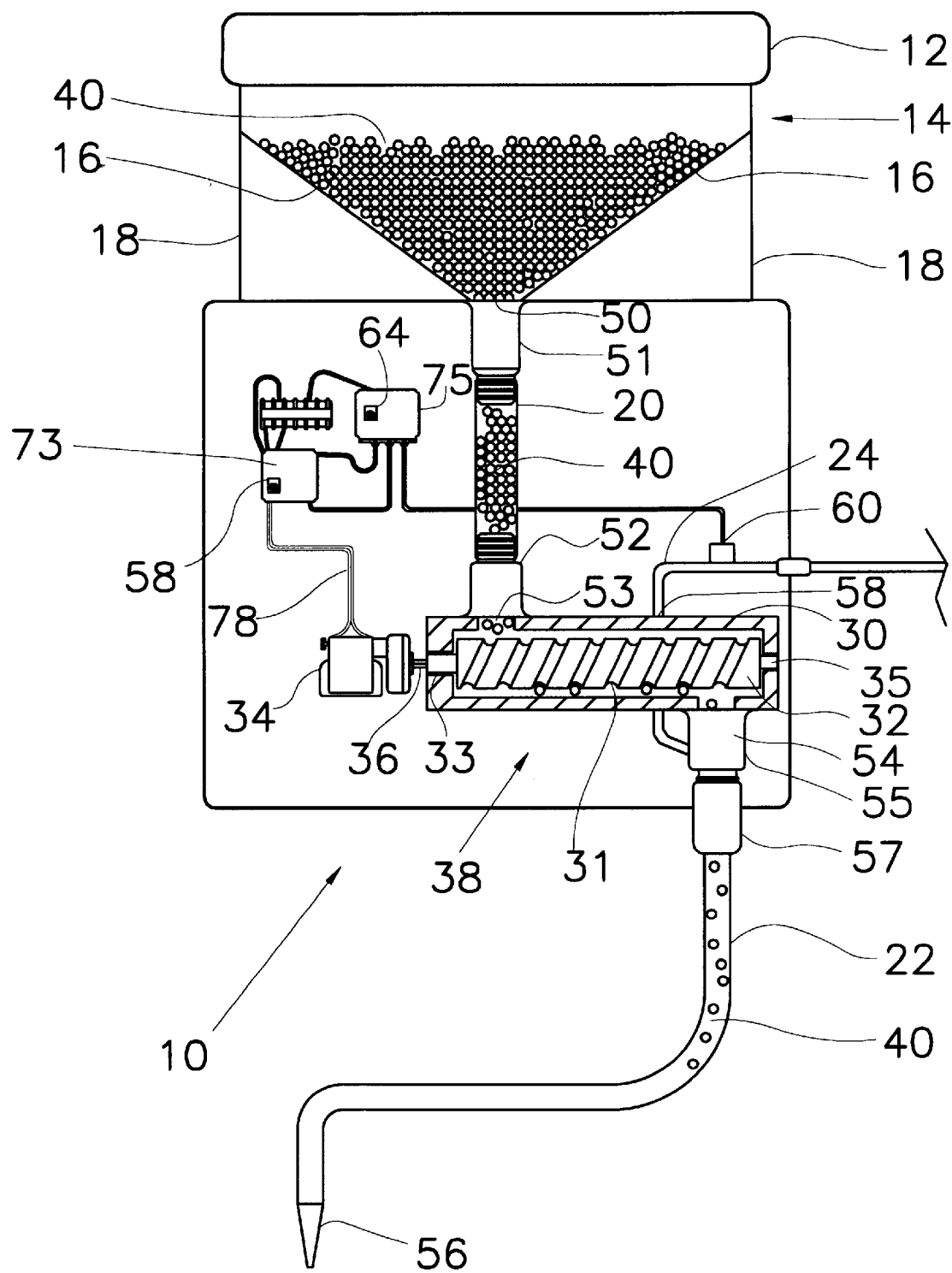
FIG. 1 is a front elevation view of the dry lube dispenser of the present invention, including the hardware and the controls for adjusting the rate of dry lube distribution, with the housing for the screw feeder being depicted in cross-section.
Figure 2:
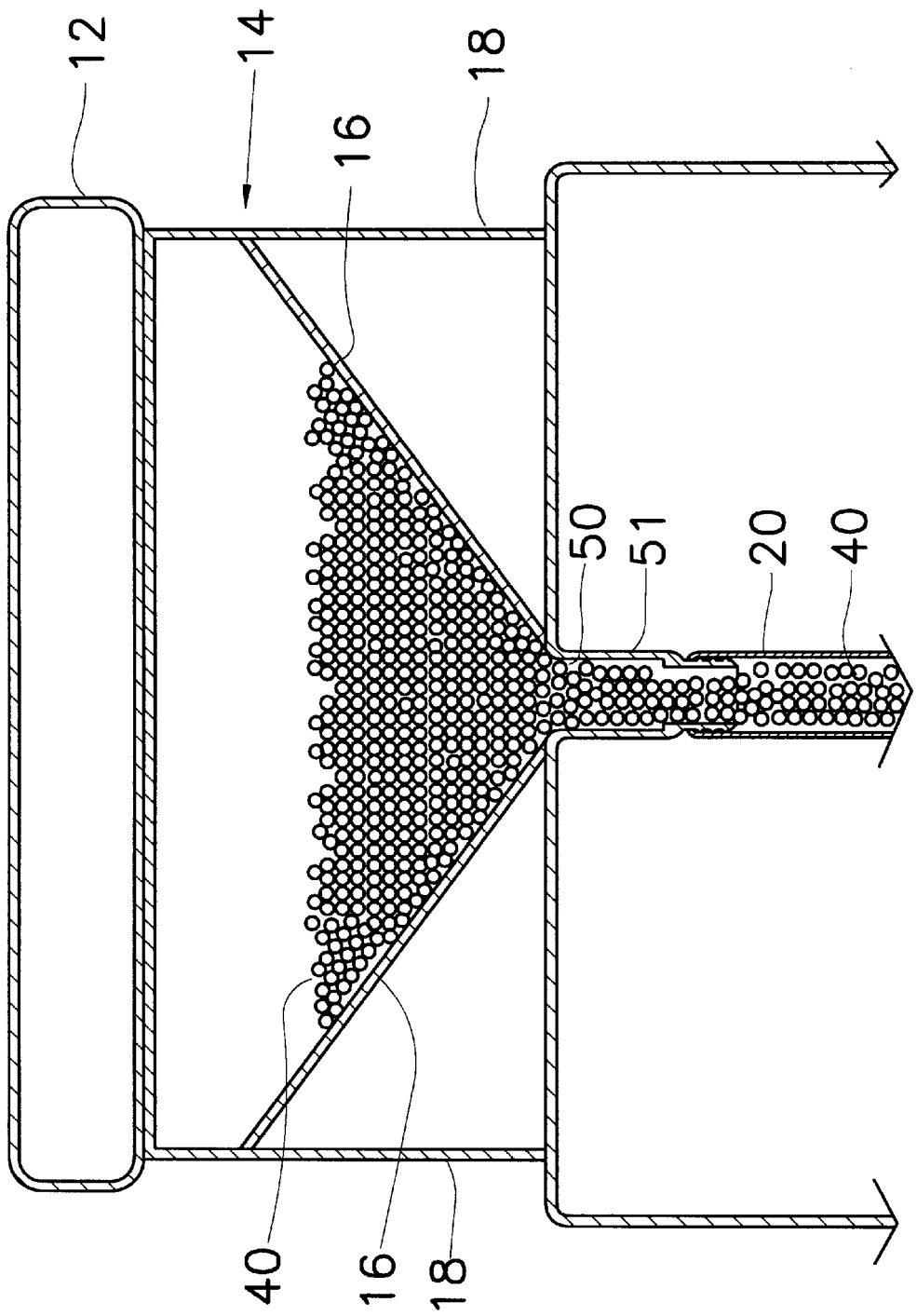
FIG. 2 is a front elevation view presenting the hopper and the vertical channeling device of the present invention in fluid communication, in cross-section.
Figure 3:
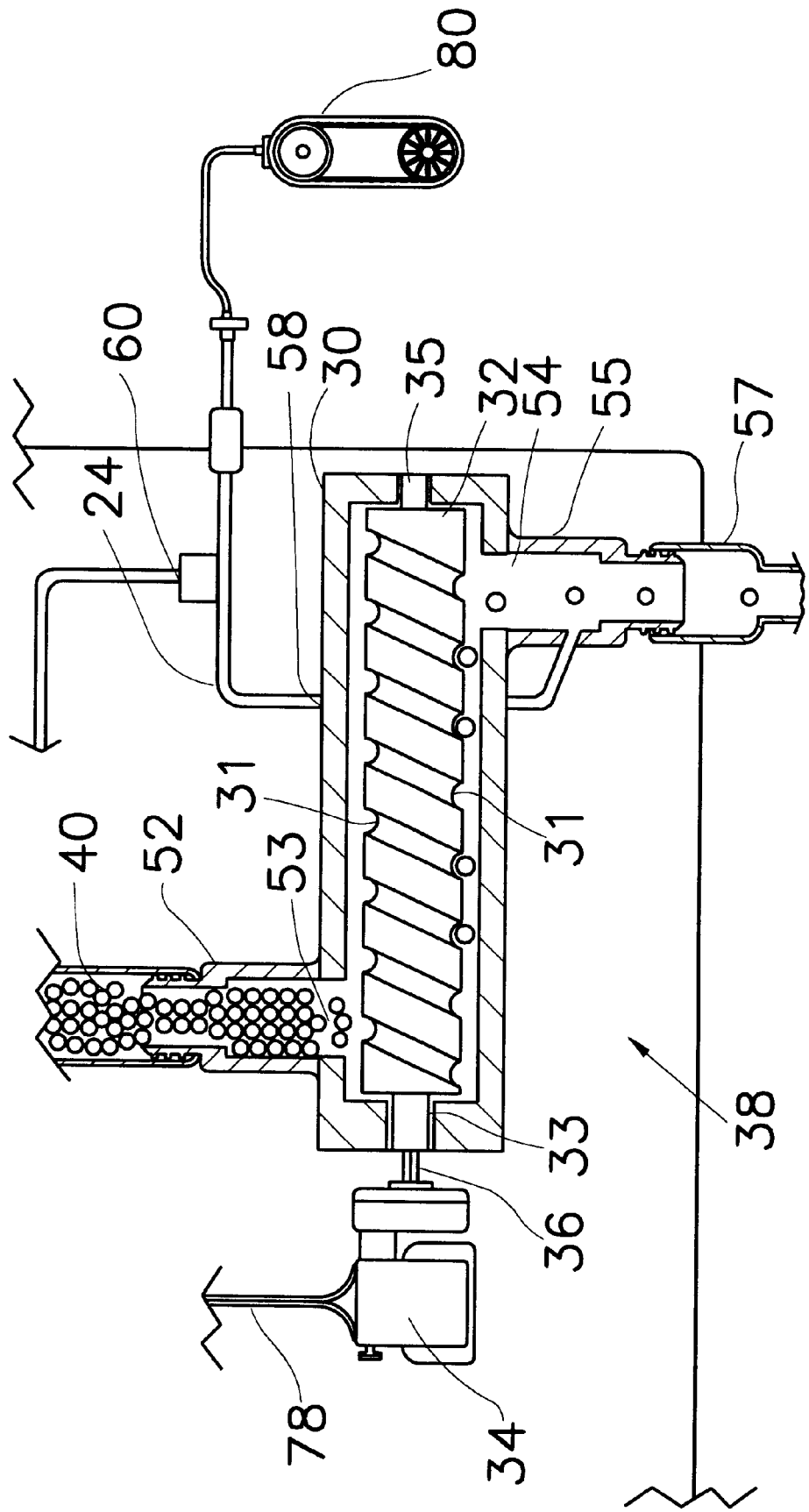
FIG. 3 is a cross-sectional view of the screw extruder mechanism and the housing output port, along with an elevation view of the rotary motor and air tube of the present invention.

A preferred embodiment of the present invention is shown generally at 10 in the front elevation view of FIG. 1. FIG. 1 demonstrates the dry lube dispenser 10, with the housing for the screw feeder being depicted in cross-section. Generally, the shot beads 40 gravitationally travel from a hopper 14 into a vertical channeling device 20. From the vertical channeling device 20, the beads 40 enter the housing 30 of the screw extruder 38. The beads 40 are then mechanically forced through the housing by the rotating screw feeder 32, or auger, and into a shot sleeve conduit 54 at a controllable rate. Those skilled in the art will understand that the output end of the shot sleeve conduit 54 fluidly connects to the shot sleeve of a die casting machine or injection molding machine, not shown.

The purpose for the dry lube dispenser 10 is to inject lubrication or some other additive into the shot sleeve of a die casting machine or injection molding device. The process for operating the dry lube dispenser 10 begins with the lubricating beads 40 themselves. Small, spherical lubricating beads 40 having a wax-based composition are chosen. The size and composition of the beads 40 will vary depending upon the type of lubricant or other additive, the size of the shot sleeve, and the type of application.

The beads 40 are fed into a hopper 14 which sits atop the bead dispensing system 10. The hopper 14 is dimensioned to receive an adequate number of beads 40 to allow the dispenser 10 to operate automatically for a period of time. In one embodiment, the hopper 14 defines a sturdy metallic box with a rectangular opening on top.

In the base of the hopper 14 is an output port 50. In the preferred embodiment, the output port 50 is a circular opening fabricated in the center of the hopper's 14 base. The port 14 must be large enough to allow beads 40 to flow through the hopper 14 without restriction, but small enough to direct the beads towards the next phase of the dry lube dispenser 10. In one embodiment, the port 50 is an opening 1.91 cm (0.75 inches) in diameter.

The beads 40 are directed towards the hopper output port 50 by the fashioning of two angled walls 16. These walls angle from the sides of the hopper 14 into the port 50. In one embodiment, these walls 16 begin 2.54 cm (1 inch) below the top of the hopper 14, and angle downward towards the port 50 at 45 degrees. In this way, the beads 40 are gravitationally directed to channel out of the hopper 14 and through the dry lube dispenser 10.

In the preferred embodiment, the hopper 14 includes a lid 12 which rests upon or fastens to the hopper 14 at the top. The purpose of the lid 12 is to sealingly cover the top opening so as to prevent the introduction of contaminants which can damage the internal components of the dispenser 10 or become part of the extrudate, thereby yielding an inferior molded product. The lid 12 further prevents shot beads from spilling in the event the hopper 14 or the entire shot bead dispenser 10 is accidentally tipped. The lid 12 thus avoids the safety hazard of having lubricating beads 40 on the user's walking surface.

Below the hopper 14, a vertical channeling device 20 is placed. This channeling device 20 is positioned below the hopper output port 50 so that the hopper 14 and the channeling device 20 are in fluid communication. In the preferred embodiment, the channeling device 20 is a tubular housing composed of a sturdy material such as glass or plastic. It is also made of a clear substance to allow the user to visually confirm the movement of dry lube 40 out of the hopper and through the dry lube dispenser 10. To ensure the unrestricted flow of beads 40 from the hopper 14, the vertical channeling device 20 has an inner diameter generally equivalent to that of the hopper output port 50.

Using the hopper 14 and the vertical channeling device 20 as a funnel, the shot beads 40 are gravitationally directed into a screw extruder mechanism 38. The screw extruder mechanism 38 is first comprised of a housing 30. In one embodiment, the housing 30 is a rectangular metal box with a cylindrical interior chamber. The housing 30 contains an input port 53 at one end, and an output port 54 at the other. Between the housing input and output ports 53 and 54 and within the housing 30 is a screw feeder 32. As will be discussed in greater detail, the screw feeder 32 operates as a rotating, horizontal auger for the purpose of transporting shot beads 40 from the housing input port 53 to the housing output port 54.

The housing input port 53 is positioned below the vertical channeling device 20. To ensure the unrestricted flow of shot beads 40, the dimensions and shape of the housing input port 53 are roughly equivalent to those of the vertical channeling device 20. By its position and size, the input port 53 places the vertical channeling device 20 and the housing 30 in fluid communication thereby allowing the shot beads 40 to be received into the housing 30 of the screw extruder 38.

In order to sealingly connect the vertical channeling device 20 with the hopper 14 and the housing 30, a means for fluidly connecting the ends of the vertical channeling device 20 with the hopper 14 and housing 30, respectively, is needed. In one embodiment, flanged nipples 51 and 52 are used. These nipples 51 and 52 are comprised of a sturdy material such as rubber or plastic. The outer diameters of the flanged nipples 51 and 52 are dimensioned to closely fit and to be received into the ends of the vertical channeling device 20.

The top end of the vertical channeling device 20 is received in a frictional fit over a top nipple 51 which is secured to the hopper output port 50. The bottom end of the vertical channeling device 20 is received in a frictional fit over a bottom nipple 52 which is secured to the housing input port 53. In the preferred embodiment, the inner diameters of the top and bottom nipples 51 and 52 at their bases are defined by the hopper output port 50 and the housing input port 53, respectively.

As the shot beads 40 travel from the hopper 14 into the housing 30, they encounter the screw feeder 32. The screw feeder 32 acts as a horizontal auger. It is manufactured from a metallic substance with high heat resistant qualities. In the preferred embodiment, the screw feeder 32 is machined from 40 wrought steel pipe. It 32 is 18.54 cm (7.30 inches) in length and has an outer diameter of 3.51 cm (1.38 inches). The helical threads 31 of the screw feeder 32 are dimensioned to receive the shot beads 40.

Circular journals 33 and 35 extend coaxially from each end of the body of the screw feeder 32. The journals 33 and 35 likewise are machined from 40 wrought steel pipe. The journal 35 at the output end is dimensioned to fit into a circular bearing at the output end of the housing 30. On the input end, the journal 33 is connected to the output shaft 36 of a rotary motor 34 by means of a typical shaft coupler (not shown). Activation of the motor 34 thus causes torque to be applied to the output journal 33 through the motor's 34 output shaft 36.

The motor 34 for the shot bead dispenser 10 is an electrically powered AC gear motor. The motor 34 is adequately powered to transmit sufficient revolutions per minute to the screw feeder 32 so as to dispense an appropriate amount of dry lube 40 through the shot bead dispenser 10.

As noted previously, the purpose for rotation of the screw feeder 32 is to mechanically move shot beads 40 from the input port 53 to the output port 54 of the housing 30. At the output port 54, the shot beads 40 exit the housing 30 and are received by a shot sleeve conduit 22. This conduit 22 is a pliable tubular channel designed to fluidly connect the dry lube dispenser 10 with a die casting machine or an injection molding device (not shown). Those skilled in the art will understand that the shot sleeve conduit 22 can be positioned so as to deliver the shot beads 40 at its output end to the shot sleeve of a die casting machine.

The shot sleeve conduit 22 may be of any length, though ideally it is several feet long so as to comfortably reach the die casting machine. It may be of any pliable material. In the preferred embodiment, the shot sleeve conduit 22 is a clear plastic hose having the same inner diameter as the vertical channeling device 20.

A means for sealingly connecting the shot sleeve conduit 22 with the housing output port 54 is needed. In the preferred embodiment, a flanged nipple 55 having the same shape and dimensions as flanged nipples 51 and 52 previously described is used. The input end of the shot sleeve conduit 22 slidably fits over the flanged nipple 55 at the housing output port connector 55. Considering that the shot sleeve conduit 22 is a pliable material and is non-stationary, the user may desire to attach a standard retractable metal clamp (not shown) over the shot sleeve conduit 22 at the point where it frictionally fits over the nipple 55 of the housing output port 54. This will help prevent a separation of the shot sleeve conduit 22 from the housing output port connector 55.

As noted previously, the output end of the conduit 22 is positioned and configured to deliver shot beads 40 to the shot sleeve of a die casting machine. To facilitate this, the output end of the shot sleeve conduit 22 is fitted to an output nozzle 56. The output nozzle 56 is dimensioned to be received into a shot sleeve. In the preferred embodiment, the output nozzle 56 is a conical reducer.

As described above, the dry lube 40 are moved through the dry lube dispenser 10 with the aid of gravity and by the mechanical means of a rotating screw feeder 32. As an additional aid, a pneumatic means may be incorporated into the dry lube dispenser 10. This is accomplished by placing an air intake port 58 in the flanged nipple 55 below the housing output port 54 of the screw extruder mechanism 38. An air tube 24 carrying compressed air is then sealingly attached to the air intake port 58. In this manner, the housing 30 and the shot sleeve conduit 22 are fluidly connected with a compressor 80. The presence of air facilitates the flow of beads 40 from the housing 30. The air not only loosens the beads 40 and keeps them from coagulating as they leave the screw feeder 32, but also cools the beads 40 as they travel to the die casting machine to prevent them from coagulating or melting.

In the present invention 10, at least one timer is used as a means to volumetrically control the flow of shot beads 40 into the shot sleeve. In the preferred embodiment, this is done by connecting the rotary motor 34 and the air compressor 80 to electrical timers 73 and 75.

Figure 4:
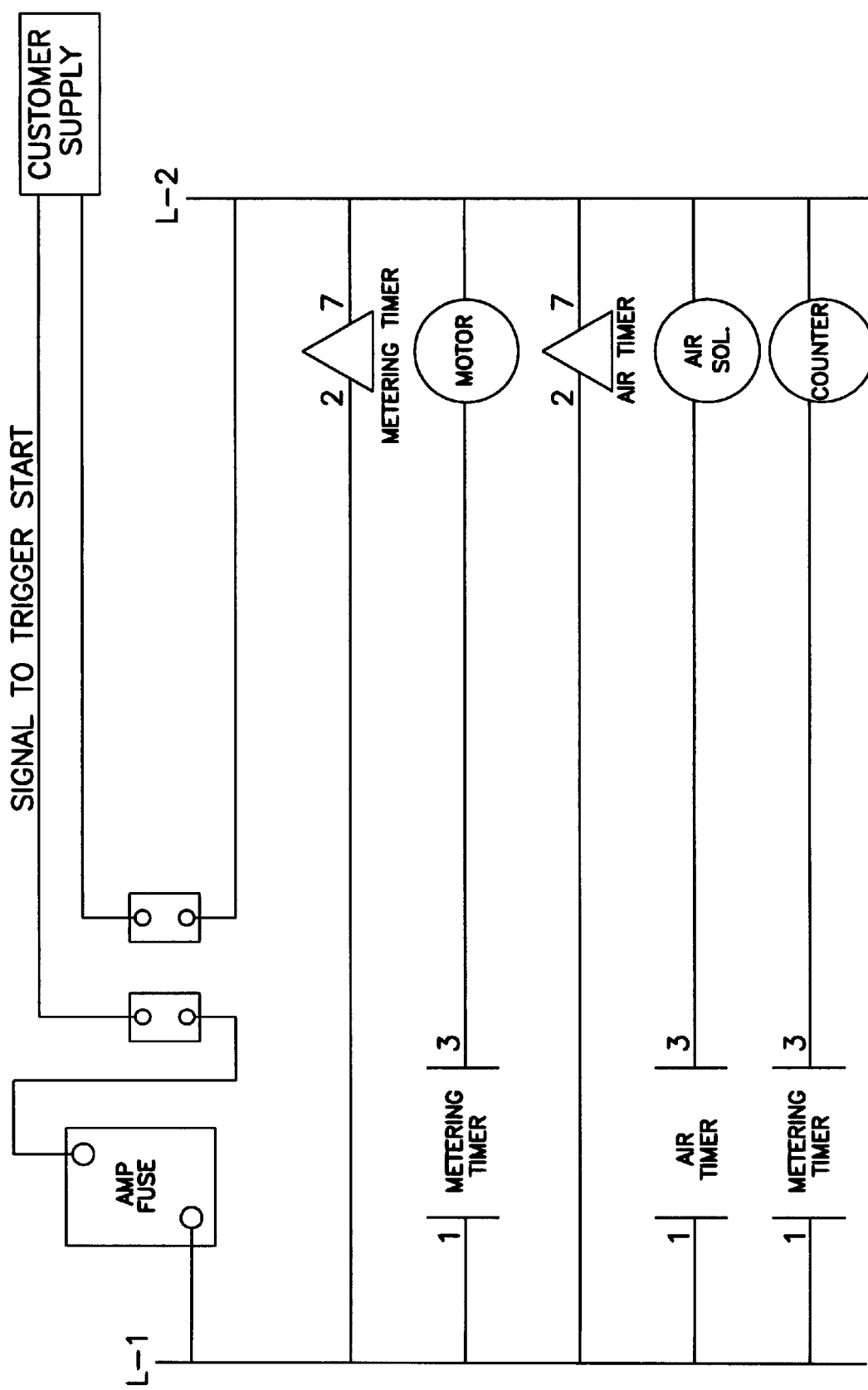
FIG. 4 is a ladder diagram depicting the electrical connections of the electrically activated components of the present invention.

FIG. 4 presents a ladder diagram demonstrating the circuitry for the electrical components of the present invention. The top of the diagram depicts wire connecting blocks 71. These blocks 71 connect the electrical components of the shot bead dispenser 10 to a power source 70.

From the blocks 71, there is a node L-1 on the high side and a node L-2 on the common side, or ground. The high side L-1 initially runs through an adequately amped fuse 72. Beyond the fuse 72, nodes L-1 and L-2 are connect to a motor metering timer 73 and an air metering timer 75. The timers 73 and 75 are adjusted to transmit power for pre-set lengths of time.

The motor metering timer 73 is connected to a motor relay 74. Likewise, the air metering timer 75 is connected to an air relay 76. The relays 74 and 76, in turn, are connected to the electrical components of the present invention. Those skilled in the art will understand that the motor relay 74 is connected to the lead wire 78 off of the motor 34, thereby allowing the motor 34 to run until the relay 74 is opened. Those skilled in the art will further understand that the air relay 76 is connected to an air solenoid 60 placed in the air tube 24 between the housing 30 and the compressor 80.

The signal, when sent, is sent to each timer 73 and 75 at the same time. Each timer 73 and 75, then, starts at exactly the same time and serves to close that part of the circuit. This cause the electrical components to start synchronistically. However, in the preferred embodiment the operation of the electrical components will not end at the same time. The air timer 75 is pre-set to run for a few seconds longer than the motor timer 73. This allows the air to assist in the movement of shot beads 40 through the shot sleeve conduit 22 before the next signal comes in.

In the preferred embodiment, the motor timer 73 and the air timer 75 are mounted onto the outside of the shot bead dispenser 10. Each timer 73 and 75 can be adjusted by a knob 58 and 64 affixed to the timers 73 and 75. Adjusting the knobs 58 and 64 allows the user to control the length of time in which the respective timers 73 and 75 are set. The user can thus make a correlation between the length of time in which the controls 58 and 64 are set, and the volume of shot beads 40 dispensed during one cycle.

An electrical counter 77 is also installed into the circuitry. The electrical counter 77 is connected to a relay 76 which, like the motor relay 74, is connected to the motor metering timer 73. The result is that each time the motor 34 is activated, the counter relay 76 is closed and the counter 77 registers one count. Hence, the user of the dry lube dispenser 10 is able to monitor the number of cycles the motor 34 is activated. By knowing the volume of shot beads 40 dispensed per cycle, the user can determine the total volume of shot beads 40 dispensed during a session.

From the foregoing description, it will be recognized by those skilled in the art that a method for injecting lubricant into the shot sleeve of a die casting machine or injection molding device offering advantages over the prior art has been provided. Specifically, the dispenser enables a user to volumetrically control the amount of lubricant or other solid placed into the shot sleeve of a die casting machine for mixture with an extrudant. It further provides a means for cooling the dry lube pellets as they are dispensed so as to prevent melting and coagulation.

While a preferred embodiment has been shown and described, it will be understood that it is not intended to limit the disclosure, but rather it is intended to cover all modifications and alternate methods falling within the spirit and the scope of the invention as defined in the appended claims. For example, the dry lube dispenser might be used to volumetrically load beads into shot gun shells. Likewise, the art of the present invention could be applied to the filling of containers for circular candy pieces.

Having thus described the aforementioned invention, we claim:

1. A dry lube dispenser for volumetrically feeding lubricating beads or other solid pellets into a die casting machine having a shot sleeve, said dry lube dispenser comprising:

a screw extruder including a screw feeder and a housing, said screw feeder operating inside of said housing, and defining an input end and an output end;

a container for holding lubricating beads, said container defining a first end for receiving the lubricating beads, and a second end sealingly connected to said input end of said screw extruder;

a conduit for holding lubricating beads, said conduit defining, a first end for receiving lubricating beads from said output end of said screw extruder, and a said second end configured to deliver the lubricating beads into the shot sleeve of the die casting machine; and a rotary motor for rotating said screw feeder to move the lubricating beads through said dry lube dispenser from said input end to said output end, said rotary motor having an output shaft coaxially aligned with and connected to said screw feeder, said rotary motor including an adjustable motor timer which activates and deactivates said motor such that the rotation of said output shaft and said screw feeder is controlled.

2. The dry lube dispenser of claim 1 wherein said screw extruder further comprises an air intake port for receiving air, and wherein said dry lube dispenser further comprises:

an air compressor;

an air tube having an input end and an output end, said input end being fluidly connected to said air compressor and said output end being fluidly connected to said air intake port; and an adjustable air timer capable of activating and deactivating the flow of air through said air tube.

3. The dry lube dispenser of claim 2 wherein said air intake port is positioned below said output end of said screw extruder.

4. The dry lube dispenser of claim 2 or claim 3 wherein said motor timer and said air timer are synchronistically metered.

5. A dry lube dispenser for volumetrically feeding lubricating beads or other solid shot beads into a die casting machine having a shot sleeve, said dry lube dispenser comprising:

a container for holding lubricating beads, said container having an input end for receiving the lubricating beads, and an output end, and further defining downwardly angled sides which converge to an output port in said output end through which the lubricating beads gravitationally move;

a screw housing defining a port at an input end which receives shot beads, and a port at an output end through which shot beads are delivered;

a first tube being vertically positioned below said container, said first tube defining a top end sealingly connected to said output port in said container so as to gravitationally receive said lubricating beads, and a bottom end sealingly connected to said port at said input end of said screw housing;

a second tube having first and second ends, said first end of said second tube being sealingly connected to said port at said output end of said screw housing, and said second end being connected to the shot sleeve of a die casting machine;

a rotary motor having a horizontal output shaft;

a screw feeder horizontally positioned within said screw housing for augerly moving said lubricating beads from said input end to said output end, said screw feeder being coaxially aligned with and connected to said output shaft of said rotary motor so as to be rotatably driven by said rotary motor;

an adjustable motor timer electrically connected to said motor, said adjustable motor timer activating and deactivating said rotary motor;

an air compressor;

an air tube defining an input end and an output end, said input end of said air tube being sealingly connected to said air compressor, and said output end of said air tube being sealingly connected to said second tube below said port in said output end of said screw housing in such a manner that activation of said air compressor causes air to be received both in said screw housing and in said second tube;

a solenoid within said air tube;

an adjustable air timer electrically connected to said solenoid within said air tube so as to open and close the flow of air from said air compressor to said screw housing, said adjustable air timer and said adjustable motor timer being synchronistically metered so as to mechanically and pneumatically move said lubricating beads through said shot bead dispenser and into said die casting machine at controllable rates.

6. A dry lube dispenser for volumetrically feeding lubricating beads or other solid pellets into a die casting machine having a shot sleeve, said dry lube dispenser comprising:

a screw extruder including a screw feeder and a housing, said screw feeder operating inside of said housing, and defining an input end and an output end;

a container for holding lubricating beads, said container defining a first end for receiving the lubricating beads, and a second end for delivering the lubricating beads into said input end of said screw extruder;

means for receiving the lubricating beads from said output end of said screw extruder and delivering them into the shot-sleeve of the die casting machine; and a rotary motor for rotating said screw feeder to move the lubricating beads through said dry lube dispenser from said input end to said output end, said rotary motor having an output shaft coaxially aligned with and connected to said screw feeder, said rotary motor including an adjustable motor timer which activates and deactivates said motor such that the rotation of said output shaft and said screw feeder is controlled.

7. The dry lube dispenser of claim 6 wherein said means for receiving the lubricating beads from said output end of said screw extruder and delivering them into the shot sleeve of the die casting machine is a conduit having a first end sealingly connected to said output end of said screw extruder for receiving the lubricating beads, and a second end configured to deliver the lubricating beads into the shot sleeve of the die casting machine.

8. The dry lube dispenser of claim 7 wherein said screw extruder further comprises an air intake port for receiving air, said air intake port being positioned below said output end of said screw extruder, and wherein said shot bead dispenser further comprises:

an air compressor;

an air tube having an input end and an output end, said input end being fluidly connected to said air compressor and said output end being fluidly connected to said air intake port; and an adjustable air timer capable of activating and deactivating the flow of air through said air tube, said adjustable air timer being synchronistically metered with said adjustable motor timer.

* * * * *